United States Patent [19]

Koch et al.

[11] Patent Number: 4,478,440

[45] Date of Patent: Oct. 23, 1984

[54] THREADED PIPE COUPLING

[75] Inventors: Ronald N. Koch, Allison Park; David A. Yanov, Monroeville, both of Pa.

[73] Assignee: Rockwell International Corporation, Pittsburgh, Pa.

[21] Appl. No.: 364,366

[22] Filed: Apr. 1, 1982

[51] Int. Cl.³ .............................................. F16L 15/00
[52] U.S. Cl. .................................... 285/392; 285/423; 285/DIG. 22; 403/343; 411/82
[58] Field of Search ........ 285/392, 393, 423, DIG. 22, 285/30; 411/411, 108, 82; 403/293, 343

[56] References Cited

U.S. PATENT DOCUMENTS

| | | | |
|---|---|---|---|
| 1,334,306 | 3/1920 | Liberty | 403/343 X |
| 1,913,030 | 6/1933 | Hux | 403/343 X |
| 2,954,246 | 9/1960 | Totah et al. | 403/343 X |
| 4,126,338 | 11/1978 | Coel et al. | 285/392 X |

Primary Examiner—Dave W. Arola

[57] ABSTRACT

Disclosed is a pipe coupling for coupling a first section of pipe with a second section of pipe. A threaded sleeve comprised of two identical semi-circular connector members is received in an annular recess formed in the exterior surface of the first pipe section. The second pipe section is secured to the first pipe section by means of an internally threaded female coupling nut. Piloting means are provided on the connector members and first pipe section to ensure proper orientation of the connector members with respect to each other.

9 Claims, 4 Drawing Figures

THREADED PIPE COUPLING

FIELD OF INVENTION

This invention relates to pipe couplings for coupling the adjacent ends of two sections of pipe and is particularly useful for coupling two sections of pipe when one or both of the sections is formed of relatively soft resilient material such as plastic or vinyl.

BACKGROUND OF THE INVENTION AND DESCRIPTION OF THE PRIOR ART

With the development of high strength, low porosity, economical non-metallic materials in recent years such as polycarbonate, vinyl, nylon, acetal and other synthetic polymer materials, it has become feasible and economically desirable to produce and market pipe sections and other pipeline elements, such as water meters, valves etc., made of such materials. Normally, such pipeline elements are connected into pipeline systems by means of threaded connections, and it is customary, for example, in the water meter art to provide the inlet and outlet sections of water meters with externally threaded male connecting sections which are received into internally threaded female coupling nuts on the section of pipe to which the meter is to be coupled. However, when the meter body is made of plastic, it has been found that when such threads are formed directly on the inlet and outlet sections of the meter body, because the plastic material is relatively soft, and the female pipe coupling to which it is to be connected is usually metal and may be slightly misaligned with the axis of the spud when the meter and the female coupling on the pipe section to which it is to be joined are connected together with sufficient locking force to insure a fluid tight seal, the threads on the meter spud frequently become damaged or cross threaded making it impossible to obtain a fluid tight seal. If the threads are formed directly on the spuds, damaged threads require that the entire meter be discarded. Various solutions to this problem have been proposed, one of which is to provide a replaceable threaded sleeve such as disclosed in the U.S. Pat. No. 4,126,338 to Coel et al. The arrangement shown in that patent employs a resilient threaded integral sleeve which is snap-fitted over the end of the pipe section or spud extending from the body of the meter. The sleeve is held in positon by means of protuberances which extend from the inside of the sleeve and are received into recesses located on the exterior surface of the meter spud. In such an arrangement if the threads on the sleeve become damaged, the sleeve is removed and replaced with a new, undamaged sleeve. It will be appreciated, however, that since that arrangement employs an interference or snap fit between the sleeve which is comprised of an integral cylinder, and the spud of the meter, mounting of the sleeve and its removal may be somewhat difficult and could cause damage to the pipe section or meter spud. Also, it should be noted that replacement of the sleeve requires removal of the meter from the line whereas with the instant invention the collar or sleeve may be replaced without removing the meter from the line.

Applicants propose an externally threaded sleeve comprised of two identical semi-circular members mounted on the end of the pipe or meter spud. Pipe couplings employing semi-circular externally threaded members are shown in the prior art of which the U.S. patents to Driscoll U.S. Pat. No. 296,394; Westinghouse et al. U.S. Pat. No. 1,586,725; Peterson U.S. Pat. No. 2,569,333 and French Pat. No. 1,197,185 are typical. However, none of the prior art shows a coupling employing easily removable identical semi-circular externally threaded members with piloting means to insure proper orientation of the semi-circular members when assembled on the pipe end and which may be snap fitted on the end of the pipe to insure its retention thereon.

SUMMARY OF THE INVENTION

In the present invention applicants employ a sleeve comprised of two identical molded semi-circular externally threaded mating connector members which are received in an annular groove around the end of the inlet and outlet pipe sections or spuds which protrude from the main body of a water meter. The two connector members are identical so they may be produced from the same mold and have piloting means which cooperate with complementary piloting means on the spud to insure proper orientation between the two members when assembled in the annular groove. The externally threaded male connector thereby formed is thus adapted to receive an internally threaded female coupling nut rotatably mounted on the end of the pipe to which the meter is to be connected. A snap fit between the two semi-circular connector members and the meter spud insures that the connector member will be retained on the pipe end or meter spud before and during connection of the pipe ends or installation of the meter in a pipeline.

PRESCRIPTION OF A PREFERRED EMBODIMENT

Figure 1:
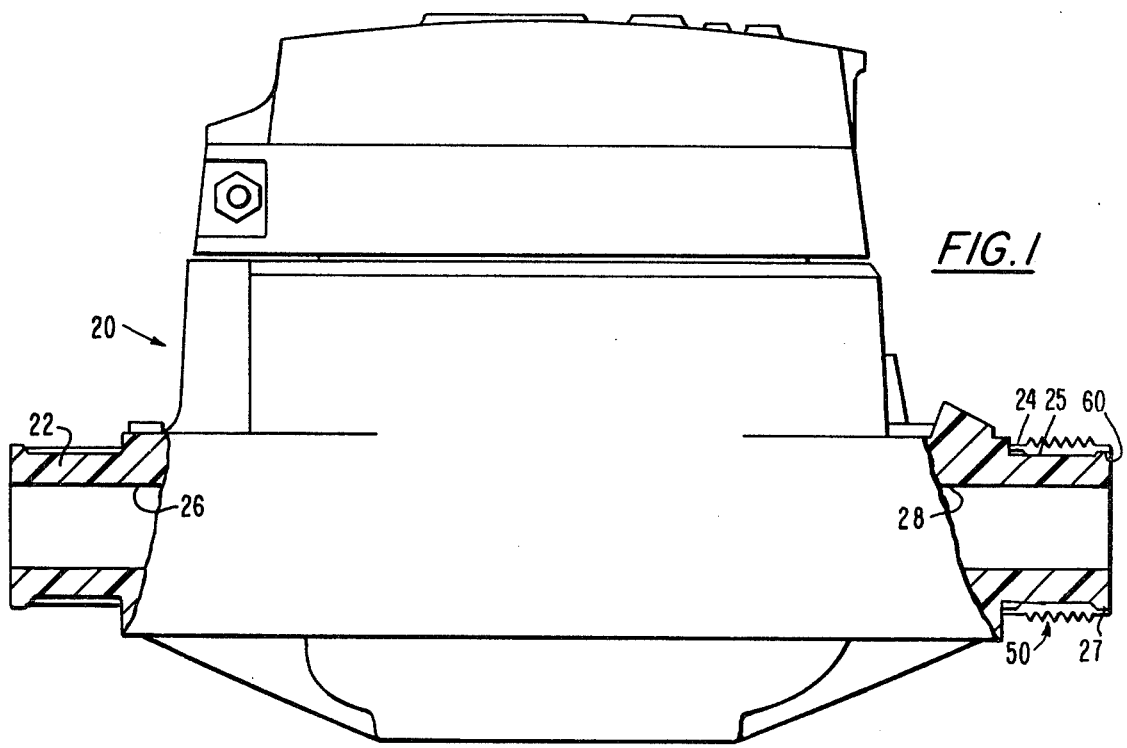
FIG. 1 is a side elevation view partly in section of a water meter employing the instant invention.
Figure 2:
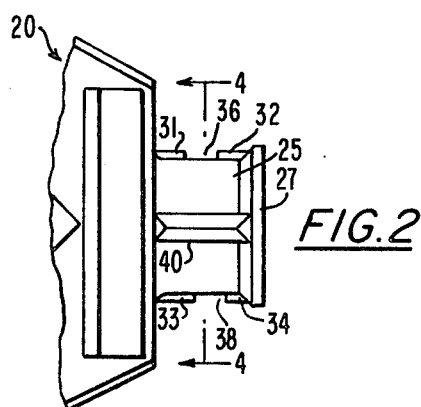
FIG. 2 is a top view of the right hand portion of the meter shown in FIG. 1 with the threaded sleeve removed.
Figure 4:
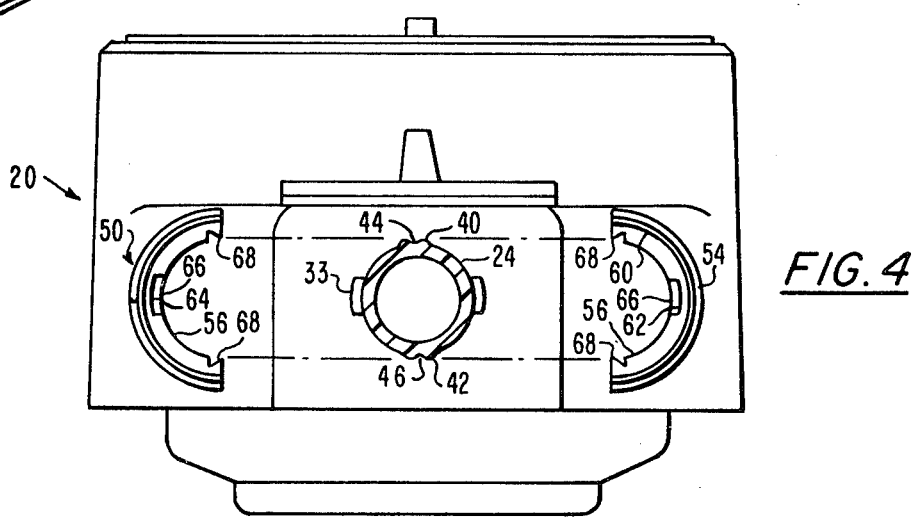
FIG. 4 is a sectional view along line 4—4 of FIG. 2.

The main case of a meter employing the instant invention is identified in the drawings generally by the numeral 20, and as shown in FIG. 1, two axially aligned spud portions 22 and 24 project from opposite sides of the main case which have inlet passage 26 and outlet passage 28 respectively formed therein. In FIG. 1 the right hand spud portion is shown with one of the semi-circular threaded connector members 50 mounted on the spud while the left hand sput 22 is shown without any threaded connector members. As best shown in FIGS. 2 and 4 the spuds have an annular recess 25 in which are formed two diametrically opposed sets of axially aligned ribs 31 and 32 on one side and ribs 33 and 34 on the other side of the spud. Ribs 31 and 32 are separated by a gap or recess 36 while ribs 33 and 34 are separated by gap or recess 38. As clearly shown in FIG. 2 gaps 36 and 38 are not aligned along a common diametrical line but are axially displaced from each other. Also formed on spud 24 are diametrically opposed locking ribs 40 and 42 each of which is respectively formed with axially extending depressions or detents 44 and 46. Most water meters are intended for replacement of meters in existing pipelines. Virtually, all existing meters are coupled to the pipelines by means of a female coupling member which has a single continuous thread, as distinct from multiple threads in which the threaded portion is comprised of two or more distinct parallel threads each having its own beginning and its own end. The male threaded portions of the replacement meters must therefore be a single continuous thread.

Figure 3:
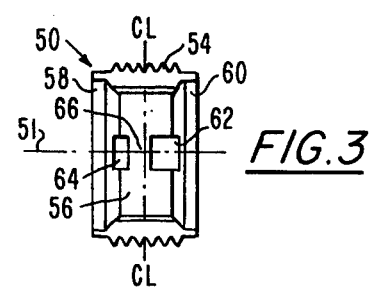
FIG. 3 is a front or interior view of one of the semi-circular threaded connector members employed in the instant invention.

Applicant's threaded connector sleeve is therefore comprised of two identical semi-circular connector members 50 which are adapted to be received on the spuds to provide a male threaded connector sleeve having a single continuous external thread for the reception of a female member having a single continuous thread and is mounted on a pipeline whereby the meter may be connected into the pipeline. FIG. 3 shows one of the semi-circular connector members 50 and FIG. 4 shows an end view of a meter with two opposed connector members 50 shown displaced from the spud 24. The connector members, which are identical and may be formed from the same mold, are made of plastic. Thus, the members 50 will have a slight amount of resiliency which as explained below will enable them to be snapped into locking engagement with the spud 24.

The external surface of the connector members 50 are threaded as shown at 54 and when two connector members are brought together with like ends adjoining each other, that is one member being rotated 180° from its position in FIG. 3 about a line perpendicular to the axis 51 of the member 50 and in a plane coincident with or parallel to the plane containing the ends of the member 50, hereinafter referred to as its centerline, a complete sleeve will be produced which has a single continuous external thread. It will be appreciated if the bottom end of one connector member were mated with the top end of the other member a continuous external thread could not be produced without displacing the two members axially with respect to each other. It is, therefore, necessary to insure that the two connector members are properly oriented with respect to each other when mounted on the spud.

The connector members have an internal surface 56 which is adapted to be received next to the surface of the spud in recess 25. Inner circular surfaces 58 and 60 have equal diameters which are slightly larger than the diameter of surface 56. Surface 60 of the right hand member 50 as shown in FIG. 4 will be received on the outer circular surface 27 on the spud (FIGS. 1 and 2). As will become evident hereinafter, the inner surface 58 of the left hand member 50 as viewed in FIG. 4 will also be received on surface 27. Depressions or recess 62 and 64 are formed in the inner surface 56 and provide between them a bridge portion 66 in the inner surface 56. It will be noted that the depressions 62 and 64 are of different axial dimension and that the bridge portion 66 is displaced somewhat from the vertical center line CL of the connector member as best shown in FIG. 3.

At each end of the semi-circular connector members, detents 68 (FIG. 4) are formed which are adapted to be received in the depressions 44 and 46 on ribs 40 and 42 respectively to lock the connector members in place on the spuds. The distance between the detents on either end of each connector member is slightly smaller than the distance between the outermost portions of locking ribs 42 and 44. However, since the connector members are slightly resilient, the ends of each connector member will be expanded outwardly by the camming action between the sides of the ribs 42 and 44 and the detents 68 when the connector members are urged radially on to the spud from the positions shown in FIG. 4, thus allowing the connector members to be snapped into place with a slight radial force being applied to them. When in position one set of adjacent detents 68 will be received in depression 44 while the opposite set of adjacent detents 68 on the connector members will be received in the depression 46, thereby holding the semi-circular connector members in place to form a complete and continuously threaded sleeve on the spud.

The connector member shown in FIG. 3 is oriented to be mounted on the spud 24 from the top as shown in FIG. 2 or from the right as shown in FIG. 4. In such a position the bridge 66 will be received in gap 36 and rib 32 will be received in recess 62 while rib 31 will be received in recess 64 of the connector member. In such a position the inner surface 60 will be received on surface 27 of the spud. In order to orient the connector member as shown in FIG. 3 or one identical to it, to be properly received on the spud from the bottom of FIG. 2, or the left in FIG. 4, the connector member must be rotated 180° about its centerline CL from the position shown in FIG. 3. In such a position the bridge 66 will be positioned to be received in gap 38, the rib 33 will be received in depression 62 and the rib 34 will be received in depression 64. Also, the surface 58 which has the same diameter as surface 60 will be received on surface 27 of the spud. If it should be attempted to urge the connector member onto the spud from the bottom as shown in FIG. 2 or at the left as shown in FIG. 4 without first rotating it 180° about its centerline from the orientation shown in FIG. 3, the bridge portion 66 would not correspond to the gap 38 and the rib portions 33 and 34 would not correspond respectively to the depressions 62 and 64. Thus, only by rotating the identical piece 180° about its centerline from FIG. 3, can the second connector member be mounted on the spud in a position where the threads of both members meet to present a complete and continuous thread for the reception of an internally threaded female connector member.

With Applicant's arrangement, any damage to the threads on a meter or pipe section resulting from initial attempts to install the meter or pipe section in an existing pipleine will not necessitate discarding the entire meter or pipe section since all that is necessary is to remove the original threaded semi-circular connector members and replace them with undamaged ones.

Applicant has therefore provided an easily replaceable threaded sleeve adapted for mating with an internally threaded coupling member of a pipeline which sleeve is comprised of two identical semi-circular connector members which may therefore be produced from the same mold cavity and which can only be mounted on the spud or the pipe in an orientation which provides for a continuous uninterrupted thread. It will be appreciated that by such an arrangement the number of molds which must be made and the number of operations to produce a completed threaded sleeve, and the number of parts that must be carried in inventory is reduced by one-half.

The invention herein described may be embodied in other specific forms without departing from the essential characteristics thereof. The present embodiment therefore is to be considered as illustrative, the scope of the invention being indicated by the appended claims. All departures from the foregoing desciption which come within the meaning and range of equivalency of the claims are therefore intended to be embraced herein.

We claim:

1. Connecting means for a pipe comprised of two identical semi-circular extending threaded connector members adapted to be removably received around the end of a pipe to form a threaded sleeve adjacent the end of the pipe, cooperating means formed on said connector members and said pipe adjacent the end of said pipe to permit mounting of said members on said pipe in only one mode of orientation with respect to each other.

2. The connecting means defined in claim 1 in which said cooperating means on said connector members and on said pipe is comprised of a bridge portion on said connector members and diametrically opposed recesses in said pipe adapted to receive respective bridge portions on said members.

3. The connecting means of claim 2 in which said bridge portions on said members are axially displaced from the centerline of said members and the opposed recesses in said pipe are axially dislaced from each other whereby the respective bridge portions on said members will be received in respective opposed recesses for said pipe only when one member is oriented in a position 180° about its vertical centerline with respect to the other of said members.

4. The connecting means defined in claim 1 in which diametrically opposed detents are formed on said pipe adjacent the end thereof and detents are formed on each end of said connector member, the detents at adjacent ends of said connector members being received in respective detents in said pipe when said connector members are snapped into place in said recess.

5. The connecting means defined in claim 1 in which said cooperating means is comprised of ribs on said pipe and recesses in said connector members adapted to receive said ribs in only one mode of orientation of said connector members with respect to each other.

6. A pipe connecting means comprised of a pipe section, an annular recess in the exterior of said pipe section adjacent the end thereof, two identical semi-circular externally threaded connector members received in said recess to provide a threaded sleeve around the exterior of said pipe section adjacent the end thereof, one end of said connector members differing from the other end, cooperating means on said connector members and on the exterior of said pipe which permits said connector members to be mounted in said recess only when said one end of one of said connector member is adjacent the other end of said other connector member.

7. The connecting means defined in claim 6 in which said connector members are formed of rigid and resilient plastic material.

8. The connecting means defined in claim 7 together with diametrically spaced detents in said recess and detents on each end of said connector members which cooperate with the detents in said recess to hold said connector members in said recess when said connector members are snapped into place in said recess.

9. The connecting means defined in claim 8 in which the distance between the detents in the opposite ends of said connector members is slightly less than the distance between the outermost surfaces on diametrically spaced detents in said recess in which the detents on said collar members are seated when said connector members are mounted in said recess.

* * * * *